US 9,435,415 B2

(12) United States Patent
Gassmann (10) Patent No.: US 9,435,415 B2
(45) Date of Patent: Sep. 6, 2016

(54) ELECTRIC DRIVE FOR A MOTOR VEHICLE

(71) Applicant: GKN Driveline International GmbH, Lohmar (DE)

(72) Inventor: Theodor Gassmann, Siegburg (DE)

(73) Assignee: GKN Driveline International GmbH, Lohmar (DE)

( * ) Notice: Subject to any disclaimer, the term of this patent is extended or adjusted under 35 U.S.C. 154(b) by 0 days.

(21) Appl. No.: 14/693,931

(22) Filed: Apr. 23, 2015

(65) Prior Publication Data

US 2015/0226296 A1   Aug. 13, 2015

Related U.S. Application Data

(62) Division of application No. 13/809,857, filed as application No. PCT/EP2010/060039 on Jul. 13, 2010, now Pat. No. 9,039,559.

(51) Int. Cl.
| | |
|---|---|
| F16H 48/30 | (2012.01) |
| F16H 3/72 | (2006.01) |
| F16H 37/02 | (2006.01) |
| F16H 37/08 | (2006.01) |
| B60K 1/00 | (2006.01) |

(52) U.S. Cl.
CPC ............. F16H 37/082 (2013.01); B60K 1/00 (2013.01); F16H 37/02 (2013.01); B60K 2001/001 (2013.01); F16H 2200/0021 (2013.01)

(58) Field of Classification Search
CPC ............. F16H 37/02; F16H 37/082; F16H 2200/00216
See application file for complete search history.

(56) References Cited

U.S. PATENT DOCUMENTS

| | | | |
|---|---|---|---|
| 4,706,518 A | 11/1987 | Moroto et al. | |
| 5,836,847 A | 11/1998 | Pritchard | |
| 6,155,364 A * | 12/2000 | Nagano .................. | B60K 6/365 |
| | | | 180/65.235 |
| 6,302,227 B1 | 10/2001 | Takemura et al. | |
| 6,406,400 B1 | 6/2002 | Shih | |
| 6,524,217 B1 | 2/2003 | Murakami et al. | |
| 6,840,880 B2 | 1/2005 | Glassner | |
| 6,881,167 B2 | 4/2005 | Inada | |
| 7,424,924 B2 | 9/2008 | Janson | |

(Continued)

FOREIGN PATENT DOCUMENTS

| | | |
|---|---|---|
| DE | 202005019438 U1 | 4/2007 |
| EP | 1541895 A2 | 6/2005 |

OTHER PUBLICATIONS

PCT International Search Report dated Jan. 17, 2011 for PCT/EP2010/060039 (9 pages).

*Primary Examiner* — Sherry Estremsky
*Assistant Examiner* — Lillian Nguyen
(74) *Attorney, Agent, or Firm* — Bejin Bieneman PLC (57) ABSTRACT

An electric drive for a motor vehicle comprises a first gear stage, driveable by the electric motor, a second gear stage, driveable by the first gear stage, and a differential drive, driveable by the second gear stage. The first gear stage has a driving wheel and an output wheel, wherein the driving wheel is arranged coaxially to the output shaft of the electric motor and is rotatingly driveable by the electric motor around a first rotational axis A. The output wheel is drivingly connected to the driving wheel and is rotatingly driveable around a second rotational axis B, wherein the second rotational axis B is arranged parallel off-set to the first rotational axis A. The second gear stage and the differential drive are arranged coaxially to the second rotational axis B.

18 Claims, 3 Drawing Sheets

(56) References Cited

U.S. PATENT DOCUMENTS

| | | |
|---|---|---|
| 7,497,286 B2 | 3/2009 | Keller et al. |
| 7,819,212 B2 | 10/2010 | Kawasaki |
| 2002/0035003 A1 | 3/2002 | Brown et al. |
| 2003/0203782 A1* | 10/2003 | Casey ............... B60K 1/00 475/150 |
| 2005/0023053 A1 | 2/2005 | Bennett |
| 2008/0076615 A1 | 3/2008 | Kim |
| 2008/0312021 A1 | 12/2008 | Oba |
| 2009/0209388 A1 | 8/2009 | Carey et al. |
| 2009/0264246 A1 | 10/2009 | Carey et al. |
| 2010/0210388 A1 | 8/2010 | Grochowski et al. |
| 2011/0011655 A1 | 1/2011 | Venturi |
| 2011/0160015 A1 | 6/2011 | Ren et al. |
| 2013/0190124 A1 | 7/2013 | Gassmann |

* cited by examiner

ELECTRIC DRIVE FOR A MOTOR VEHICLE

CROSS-REFERENCE TO RELATED APPLICATIONS

This application is a divisional of U.S. application Ser. No. 13/809,857 filed on Jan. 11, 2013, which in turn is a National Phase of International Application No. PCT/EP2010/060039, filed on Jul. 13, 2010, which applications are hereby incorporated by reference in their entireties, and to which applications this application claims priority.

TECHNICAL FIELD

The disclosure relates to an electric drive for a motor vehicle as well as a motor vehicle with such an electric drive. The electric drive can serve as an exclusive drive for the motor vehicle or, additionally, a combustion engine can be provided. In this case, the electric drive and the combustion engine can drive the vehicle, respectively, on their own or together superimposed. Such drive concepts are also designated as "hybrid drives".

BACKGROUND

Usually, an electric drive comprises an electric motor as well as a reduction drive arranged downstream that reduces the rotational movement produced by the electric motor, from faster to slower. The torque is transmitted from the reduction drive to the drive line of the motor vehicle. For this, a differential drive, which is arranged downstream in the torque flow of the reduction drive, splits the introduced torque onto two output shafts for driving the wheels. The two output shafts of the differential drive have a balancing effect on each other, i.e., if one of the two output shafts rotates faster, then the other of the two output shafts rotates correspondingly slower, and vice versa.

From U.S. Pat. No. 7,497,286 B2 an electric drive for driving a motor vehicle is known. The electric drive comprises an electric motor, a planetary drive as a reduction drive and a differential drive, which is arranged downstream of the reduction drive in the torque flow. The planetary drive and the differential drive are arranged coaxially and within the electric motor. The sun gear of the planetary drive is driven by the electric motor. The planet carrier is supported and the ring gear drives the differential carrier of the differential drive.

From DE 20 2005 019 438 U1 a drive unit is known, in which the electric motor is arranged coaxially to the differential drive. A speed reduction is achieved via a gear stage on a countershaft. On the countershaft, a shift drive is provided, which has two gear stages and is shiftable via two switching clutches.

From DE 100 02 133 B4 a hybrid drive for a motor vehicle is known, in which an electric motor and a planetary drive are arranged coaxially to each other. The force transmission onto the axle off-set differential drive is achieved by means of a belt drive via a continuously variable drive as well as a clutch.

SUMMARY

The integration of an electric drive or hybrid drive, respectively, with a downstream arranged reduction drive is very often difficult, because of an available space, which is very tightly dimensioned.

An electric drive for a motor vehicle is proposed herein, wherein the electric drive comprises an electric motor and a drive unit. The drive unit has a first gear stage, driveable by the electric motor, a second gear stage, driveable by the first gear stage and a differential drive, driveable by the second gear stage, wherein the first gear stage has a driving wheel and an output wheel, wherein the driving wheel is arranged coaxially to an output shaft of the electric motor and is rotatingly driveable by the electric motor around a first rotational axis, and wherein the output wheel is drivingly connected to the driving wheel and is driveable rotatingly around a second rotational axis. The second rotational axis is arranged parallel off-set to the first rotational axis. The second gear stage and the differential drive are arranged coaxially to the second rotational axis.

The disclosed electric drive advantageously has a compact configuration. This is, the axle-offset existing between the rotational axis of the electric motor and the second rotational axis of the second gear stage is used by the first gear stage to produce a reduction to the slower speed. Furthermore, it is advantageous concerning the configuration space that the second gear stage and the differential drive are arranged coaxially to each other. As the planetary drive and the differential drive are arranged coaxially to each other or to the second rotational axis, the drive unit has a small radial configuration size.

The electric drive may be suitable as an exclusive drive for a motor vehicle or as an additional drive source in a motor vehicle, which has a combustion engine as the main drive source, which are also designated as hybrid drives. The electric drive can be used for driving any drive axle, i.e. front axle as well as rear axle.

According to one exemplary embodiment, the first gear stage comprises a reduction drive, which produces a transmission to a slower speed. Thus, the input element of the second gear stage rotates slower than the output wheel of the first gear stage. The gear stage can have a belt drive or a chain drive or a spur gear drive. In this case, the use of a belt drive has an advantage, in that the first gear stage can run dry, i.e. a lubrication of only the second gear stage or the differential drive is necessary. In the embodiment with a belt drive, the drive wheel is a first belt pulley with a smaller diameter and the output wheel is a second belt pulley with a larger diameter. In this case, the first and second belt pulleys are drivingly connected via a continuous belt to each other. When using a chain drive, the configuration is similar. The drive wheel is a small sprocket, the output wheel is a sprocket with larger diameter. The two sprockets are drivingly connected via a continuous chain for the transmission of a torque to each other. When using a spur gear drive as a first gear stage, the first driving wheel and the second driving wheel are drivingly connected by direct tooth meshing or via further interconnected toothed gears to each other for the transmission of a torque.

According to another exemplary configuration, the second gear stage comprises at least a planetary drive with a ring gear, a sun gear, a multitude of planetary gears as well as a planet carrier. The ring gear, the sun gear and the planet carrier are arranged coaxially to the second rotational axis. The planetary gears are rotatably supported on the planet carrier and rotate therewith together around the second rotational axis. In this case, the planetary gears mesh, respectively, with the sun gear and the ring gear. In one exemplary configuration, one of the gears, the sun gear or the ring gear, is drivingly connected to the output wheel of the first gear stage, while the other of the two gears, the ring gear or the sun gear, is support or supportable on a stationary component. The output element of the planetary drive serves a planet carrier, which is connected to the differential carrier for transmitting a torque.

The stationary component can, for example, be a drive housing or a component connected thereto. For the torque transmission between the output wheel of the first gear stage and the input wheel of the second gear stage, a hollow shaft can, for example, be interconnected, which is arranged coaxially to the second rotational axis and through which a side shaft of the motor vehicle, driven by the differential drive, is passed. An especially compact configuration is achieved with a direct torque flow, if the torque is introduced via the sun gear into the planetary drive and if the ring gear is support or supportable on the stationary component.

The ring gear can be permanently connected and rotationally fixed to the stationary component, which is also designated as supported, or the ring gear can be selectively connected and rotationally fixed to the stationary component and can be disconnected therefrom, which is also designated as supportable. This releasable rotationally fixed connection can, for example, be achieved by a clutch, which is arranged in the power path between the ring gear and the stationary component.

The differential drive comprises several differential gears rotatably supported in the differential carrier, which rotate together with the differential carrier around the rotational axis, as well as two side shaft gears, which are rotatably supported coaxially to the rotational axis and which mesh with the differential gears. For a compact configuration, it is advantageous if the planetary drive is arranged axially next to the differential carrier.

According to a further exemplary embodiment, an external controllable clutch assembly can be provided, which may be arranged between the ring gear of the planetary drive and the stationary component. The clutch assembly is formed such, that, selectively, a torque can be transmitted between the ring gear and the stationary component or the torque transmission can be interrupted. The clutch assembly can, in principle, be arranged at any position in the power path between the ring gear and the stationary component. For actuating the clutch assembly, at least one external controllable actuating device is provided. The actuating device is controlled according to one exemplary embodiment by the electronic control unit of the motor vehicle. A flexible torque introduction or a change of the transmission ratio is achieved in an advantageous manner by the use of the clutch assembly.

According to another exemplary arrangement, with a clutch, the planetary drive comprises two planetary gear stages, which are arranged, function-wise, parallel to each other and have a different transmission ratio, i.e. the first planetary gear stage has a first transmission ratio and the second planetary gear stage has a second transmission ratio between the input element and the output element. By this arrangement, it is achieved in an advantageous manner, that the torque introduced into the planetary drive is selectively transmitted onto the differential drive via the first planetary gear stage, so that the differential carrier is driven with a first number of revolutions or via the second planetary gear stage, so that the differential carrier is driven with a different second number of revolutions. The two planetary gear stages comprise each a sun gear, a ring gear, a multitude of planetary gears and a planet carrier, on which the planetary gears are rotatably supported. The gears of the first planetary stage are designated in the following also as first gears and the gears of the second planetary stage are also designated as second gears.

The first and the second sun gear are connected so as to be rotationally fixed to each other, so that they rotate with the same number of revolutions around the second rotational axis. The first and second planetary gears are connected correspondingly to the planet carrier, respectively the differential carrier, so that they rotate together therewith. The first and second ring gear can, selectively, be supported on the stationary component against rotation and can be released therefrom.

The clutch assembly can have different embodiments. For example, the clutch assembly may comprise one or more switching clutches, which achieve, especially, by formfitting means, a torque transmission between a first clutch element and a second clutch element. For example, a denture clutch or a claw clutch can be used. The clutch assembly can also comprise one or more friction clutches, which carry out a torque transmission by force transmission. The friction clutches have the advantage, that the torque transmission between the open position, in which no torque is transmitted, and a closed position, in which the full torque is transmitted between the clutch input element and the clutch output element, is variably adjustable also in any intermediate position.

In the embodiment in which the clutch assembly comprises at least one switching clutch, the switching clutch is transferable at least into a first switching position and into a second switching position. In the first switching position, the first ring gear is connected so as to be rotationally fixed to the stationary component and the second ring gear is freely rotatable relative to the stationary component. Vice versa, in the second switching position of the switching clutch, the first ring gear is freely rotatable relative to the stationary component, while the second ring gear is connected so as to be rotationally fixed to the stationary component for the transmission of a torque. By means of switching the switching clutch into the first or second position, different transmission ratios of the planetary drive can be achieved, for example a transmission ratio of the planetary drive, which is smaller than 20, i.e. $i1<20$, and a smaller second transmission ratio, which, depending on the number of teeth of the gears, can, for example, be between 8 and 15, i.e. $i2=8-15$. When using a friction clutch instead of a switching clutch, the transmission ratio would also be freely adjustable in the intermediate ranges between the first and the second transmission ratio. The switching clutch may be additionally transferable into a third switching position, in which the first ring gear and the second ring gear are freely rotatable relative to the stationary component.

For the highest degree of flexibility concerning the adjustment of the to be transmitted torque, it is advantageous, when the clutch assembly comprises a first friction clutch, which is arranged between the first ring gear and the stationary component, and a second friction clutch, which is arranged between the second ring gear and the stationary component. In this case, it is, especially, provided, that the first and the second friction clutch, respectively, are variably controllable between an open position, in which the torque transmission is interrupted, and a closed position, in which the torque is transmitted. In one exemplary arrangement, the friction clutches are formed as friction disk clutches. The friction disk clutches comprise, respectively, a first clutch element, with which the first disks are connected rotationally fixed, and a second clutch element, with which the second disks are connected rotationally fixed. In this case, the first and second disks are arranged axially alternatingly and form together a disk pack.

According to another embodiment, a separate actuating devices is provided for each one of the first and for the second friction clutch, which can actuate individually the corresponding friction clutch. The two actuating devices may be selectively controlled by an electronic control unit.

The electric drive can have one or more of the above named embodiments. The electric drive does provide an advantage for motor vehicles in that only a small configuration space has to be provided. By using a clutch assembly or a multitude of planetary gear stages, different transmission ratios can be produced, which can be adapted to the requirements of the motor vehicle drive.

DETAILED DESCRIPTION OF THE DRAWINGS

Exemplary embodiments are described in the following using the drawing figures, wherein.

DETAILED DESCRIPTION

Figure 1:
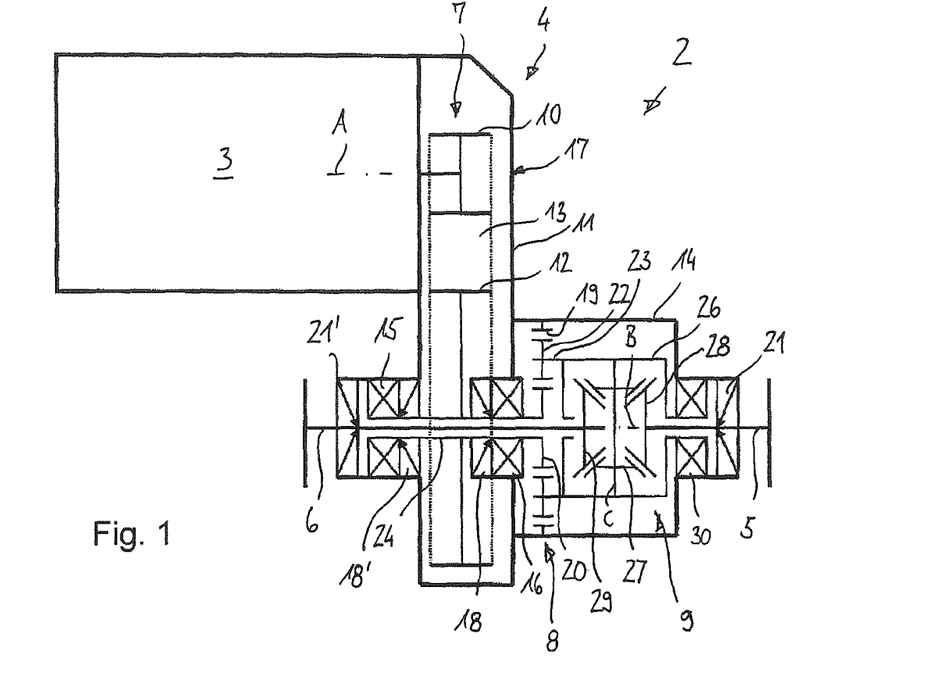
FIG. 1 schematically illustrates an electric drive according to a first embodiment having a belt drive, FIG. 2 schematically illustrates an electric drive according to a second embodiment having a chain drive, FIG. 3 schematically illustrates an electric drive according to a third embodiment with a spur gear drive, FIG. 4 schematically illustrates an electric drive according to a fourth embodiment with a belt drive and a switchable planetary drive, FIG. 5 schematically illustrates an electric drive according to a fifth embodiment with a chain drive and a switchable planetary drive, FIG. 6 schematically illustrates an electric drive according to a sixth embodiment with a spur gear drive and a switchable planetary drive.

FIG. 1 shows an electric drive 2 according to a first embodiment. The electric drive 2 comprises an electric motor 3 and a drive unit 4, which transmits the torque introduced by the electric motor 3 onto two side shafts 5, 6. The drive unit 4 comprises a first gear stage 7, a second gear stage 8 and a third gear stage 9, which is formed as a differential drive. It is visible, that the electric motor 3 and the differential drive 9 are arranged off-set at a distance to each other.

The first gear stage 7 comprises in the present embodiment according to FIG. 1 a belt drive arrangement with a driving wheel 10 and an output wheel 12, which is driven via a continuous belt 13 by the driving wheel 10. It is visible, that the output wheel 12 has an essentially larger diameter than the driving wheel 10, so that here a transmission to the slower is achieved. The axle off-set between the electric motor 3 and the planetary drive 8 or the differential drive 9 is bridged by the first gear stage 7.

The driving wheel 10 is rotatingly driven by the output shaft of the electric motor 3 around a first rotational axis A. The output wheel 12, which is rotatingly driven by the belt 13, is connected in a fixed manner to a hollow shaft 24, which is rotatably supported by first and second bearing arrangements 15, 16 in a stationary housing 17 of the drive unit 4. The annular chamber between the stationary housing 17 and the rotatingly driveable hollow shaft 24 is sealed by suitable sealing elements 18, 18', such as, for example, radial shaft sealing rings. Thus, it is prevented, that lubricant, which serves for lubricating and cooling the planetary drive 8 and the differential drive 9, gets into the inner chamber of the first gear stage 7. The housing portion 11 of the stationary housing 17, in which the belt drive is arranged, is dry, as no lubrication is necessary for the belt drive. In contrast thereto, the second housing portion 14, in which the planetary drive 8 and the differential drive 9 are accommodated, is filled with lubricant. The annular chamber between the side shafts 5, 6 and the stationary housing 17 or the sleeve lugs of the housing 17 is sealed by suitable sealing elements 21, 21', which can, for example, be in the form of radial shaft seal rings.

Within the housing portion 14, the planetary drive 8 and the differential drive 9 are accommodated. The planetary drive comprises a sun gear 20, which is connected in a fixed manner to the hollow shaft 24 and rotates therewith around a second rotational axis B, a ring gear 19, which is arranged coaxially to the sun gear 20 and is connected rotationally fixed to the housing 17, a multitude of planetary gears 22, which mesh with the ring gear 19 and the sun gear 20, as well as a planet carrier 23. The planet carrier 23 is arranged coaxially to the rotational axis B and transmits the torque introduced into the planetary gear 8 onto the differential drive 9. The ring gear 19 is fixed internally on the housing 17, for example is welded or screwed thereto. The drive is achieved in this case from the hollow shaft 24 via the sun gear 20 and the planetary gears 22 onto the planet carrier 23. However, also an embodiment is, in principle, possible, in which the ring gear is driveable by the shaft, while the sun gear is supported against rotation on a stationary component, for example on a housing.

The differential drive 9 comprises a differential carrier 26, which is connected in a fixed manner to the planet carrier 23 and is rotatingly driveable by the same around the rotational axis B, a multitude of differential gears 27, which are rotatably supported in the differential carrier 26 on the rotational axes and rotate together with the differential carrier 26 around the rotational axis B, as well as two side shaft gears 28, 29, which each are rotatably arranged coaxially to the rotational axis B and mesh with the differential gears 27. The differential carrier 26 is rotatably supported via the bearing arrangements 16, 30 in the housing 17 around the rotational axis B. The torque introduced into the differential carrier 26 is transmitted via the differential gears 27 onto both side shaft gears 28, 29, wherein a balancing effect exists between the two side shaft gears 28, 29. The side shaft gears 28, 29 are again connected for the transmission of a torque rotationally fixed to the corresponding side shafts 5, 6, which transmit the introduced torque onto the wheels of the motor vehicle.

It is visible, that the planet carrier 23 of the planetary drive 8 is connected in a fixed manner to the differential carrier 26 of the differential drive 9, i.e. the planet carrier 23 forms the output element of the planetary drive 8, by means of which the torque is introduced by the planetary drive 8 into the differential drive 9. By the present configuration of the drive unit 4 with a first gear stage 7 in form of a belt transmission, a second gear stage 9 as a planetary drive with a sun gear 20 as an input element, with a rotationally fixed supported ring gear 19 and the planet carrier 23 as the output element, a transmission ratio to the slower can be achieved of less than 20, i.e. i<20. In this case, the achievable transmission ratio depends on the diameter ratio between the driving wheel 10 and the output wheel 12 as well as on the number of teeth of the wheels 19, 20, 23 of the planetary drive 8. Depending on the diameter ratio or the number of teeth ratio, the drive unit 4 can be formed such that the differential carrier 26 rotates up to 20-times slower than the driving shaft of the electro motor 3. In the present embodiment with a belt drive 7, the internal chamber of the drive portion 11, in which the belt drive 7 is arranged, is dry, which means no lubrication is necessary here. Only the drive portion 14 is filled with lubricant for cooling or lubricating the planetary drive 8 and the differential drive 9.

Figure 2:
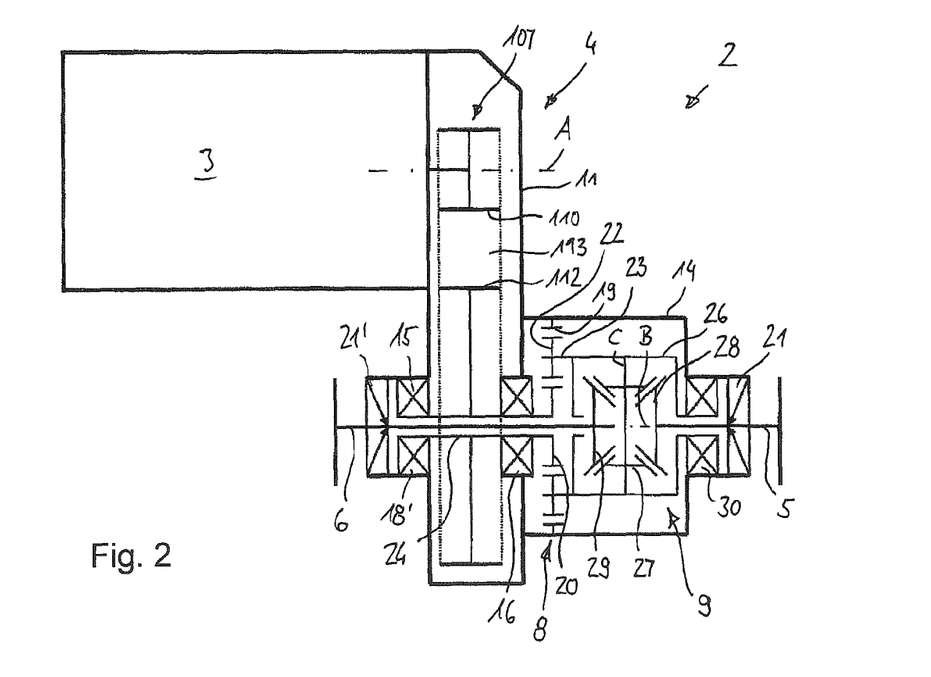

FIG. 2 shows an electric drive 2 according to a second embodiment. This embodiment generally corresponds to the embodiment shown in FIG. 1, so that concerning the common features, it is referred to the above description. In this case, the same components are provided with the same reference numerals and changed components are provided with reference numerals increased by the numerical value 100.

The only difference between the present embodiment and that shown in FIG. 1 is, that the first gear stage 107 is formed as a chain drive, which has a driving wheel 110, an output wheel 112 and a continuous chain 113 for the transmission of the torque by the driving wheel 110 onto the output wheel 112. As a chain drive is used as the first gear stage 107, the whole drive unit 4 can run for cooling or lubrication in a joint oil bath within the stationary housing 17. Special seals between the housing portion 11 for the chain drive 7 and the housing portion 14 for the planetary drive 8 or the differential drive 9 are not necessary.

With the present embodiment with a chain drive 107, a transmission to a slower speed can be achieved with a transmission ratio of up to 20, i.e. i<20.

Figure 3:
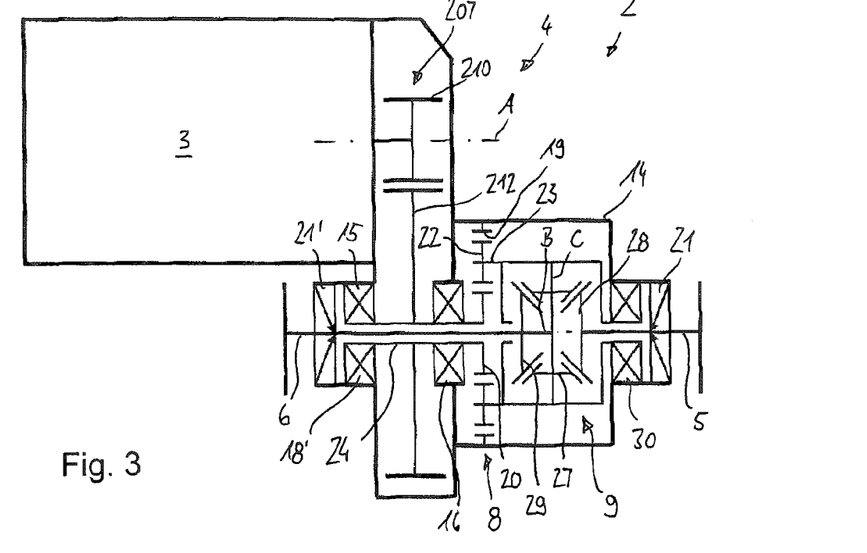

FIG. 3 shows an electric drive 2 according to a third embodiment. This embodiment generally corresponds to the embodiment depicted in FIG. 2, so that concerning the common features, it is referred to the above description. In this case, the same or corresponding components are provided with the same reference numerals and changed components are provided with reference numerals again increased by the numerical value 100.

The only difference between the present embodiment and that shown in FIG. 2 is, that the first gear stage 207 is formed as a single-step spur gear drive, which transmits the torque, introduced by the electric motor 3, to the hollow shaft 24.

The spur gear drive 207 comprises a first toothed wheel 210, which is also designated as the driving wheel, and a second toothed wheel 212, which is meshing with the first toothed wheel 210 and can also be designated as the output wheel. It is visible, that the second toothed wheel 212 is connected in a fixed manner to the hollow shaft 24 for the torque transmission. The two toothed wheel 210, 212 are, especially, formed as spur gears, preferably with helical gearing. The number of teeth of the two toothed gears 210, 212 is selected such, that with the drive unit 4 according to the present embodiment between the electric motor 3 and the differential carrier 26, a transmission to the slower with a transmission ratio of smaller than 20 is achieved, (i<20), i.e. the differential carrier 26 rotates slower than the output shaft of the electric motor 3. As in the embodiment of FIG. 2, also in the present embodiment according to FIG. 3, no special sealing means are necessary between the first housing portion 11 and the second housing portion 14. The drive unit 4 runs in a joint oil bath. The present embodiment shows a single-stage spur gear drive 7 as a first drive stage. It is, however, clear, that the first gear stage, depending on the required transmission ratio, can also be formed as a multi-step spur gear drive, which can have two or more spur gear pairs.

Figure 4:
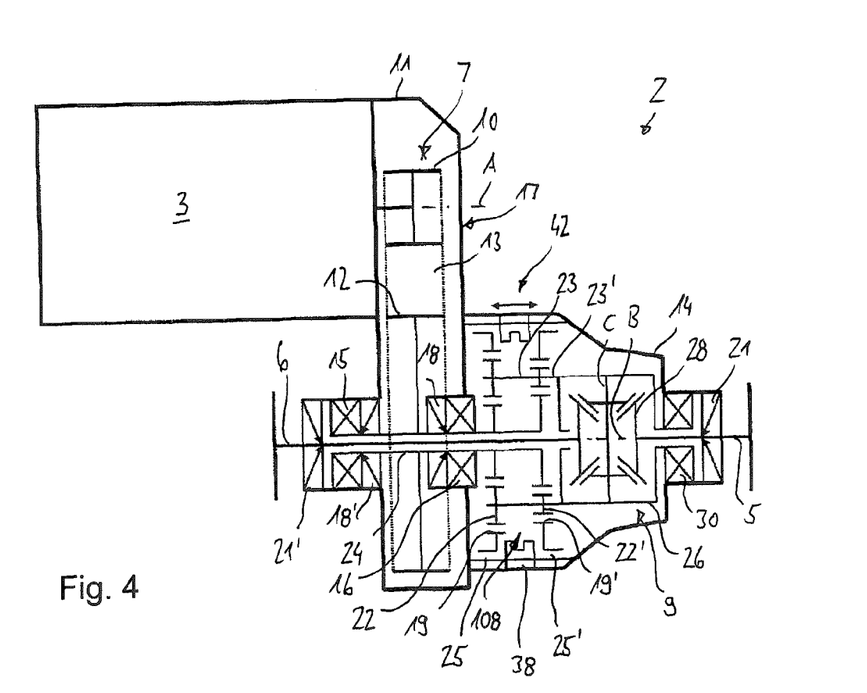

FIG. 4 shows an electric drive 2 according to a fourth embodiment. This corresponds generally to that shown in FIG. 1, so that concerning the common features, it is referred to the above description. In this case, same or corresponding components are provided with the same reference numerals and changed components are provided with reference numerals again increased by the numerical value 100.

The special features of the present embodiment are, that the planetary drive 108 has two planetary gear stages 25, 25', which selectively can transmit the torque to the differential carrier 26, wherein the clutch assembly 42 is provided for switching the planetary gear stages 25, 25'. The two planetary gear stages 25, 25' are arranged parallel concerning the function, i.e. the torque introduced into the hollow shaft 24, is transmitted via the first planetary gear stage 25 or via the second planetary gear stage 25' to the differential carrier 26. The first planetary stage 25 comprises a first sun gear 20, first planetary gears 22, a first ring gear 19 and a first planet carrier 23. The second planetary gear stage 25' comprises a second sun gear 20', second planetary gears 22', a second ring gear 19' and a second planet carrier 23'. It is visible, that the first gears 19, 20, 22 have different diameters and, thus, different numbers of teeth than the second gears 19', 20', 22'. In this way, by means of the torque transmission via the first planetary gear set 25, a different transmission ratio can be achieved than in the torque transmission via the second planetary gear set 25', so that the differential carrier 26 can be driven with different numbers of revolution.

The first and the second sun gear 20, 20' are connected so as to be rotationally fixed to each other or to the hollow shaft 24, so that they rotate with the same number of revolutions around the second rotational axis B. The first planetary gears 22 are connected via the first planet carrier 23 to the differential carrier 26. Correspondingly, the second planetary gears 22' are connected via the second planet carrier 23' to the differential carrier 26. Thus, the first planetary gears 22 as well as the second planetary gears 22' rotate together with the differential carrier 26 around the rotational axis B. The first and second internal gears 20, 20' can selectively be supported on the housing 17 rotation-wise or can be released thereto.

The clutch assembly 42 comprises in the present embodiment a switching clutch. The switching clutch 42 can realize three switching positions, which are achieved by means of a transferable sliding sleeve 38. The control is carried out via an electronic control unit (not shown), which controls an actuating device, which again transfers the switching clutch 42, when required, into the required switching position.

In a first switching position, the first ring gear 19 is connected so as to be rotationally fixed to the stationary housing 17, while the second ring gear 19' can freely rotate relative to the stationary housing. In this switching position, the torque transmission is achieved from the hollow shaft 24 via the first planetary gear stage 25 to the differential carrier 26. In this case, the present electric drive 2 operates as in the embodiment of FIG. 1, wherein a reduction ratio can be achieved of up to 20.

In a second switching position, the ring gear 19 is freely rotatable relative to the stationary housing 17, while the second ring gear 19' is connected so as to be rotationally fixed to the stationary housing 17. In this switching position, the torque transmission is achieved from the hollow shaft 24 via the second planetary gear stage 25' onto the differential carrier 26. Depending on the diameter ratio or the number of teeth ratio, the gears 19', 20', 22' of the second planetary gear stage 25', transmission ratios of eight to fifteen can be achieved in the second switching position, i.e., i=8-15. In this case, a transmission ratio of eight means, for example, that the differential carrier 26 rotates slower than the electric motor 3.

In the third switching position, the first ring gear 19 as well as the second ring gear 19' are freely rotatable relative to the housing 17. In this switching position no torque is transmitted between the hollow shaft 24 and the differential carrier 26 or between the electric motor 3 and the side shafts 5, 6. This is, for example, necessary, when the motor vehicle has to be towed during a breakdown.

Figure 5:
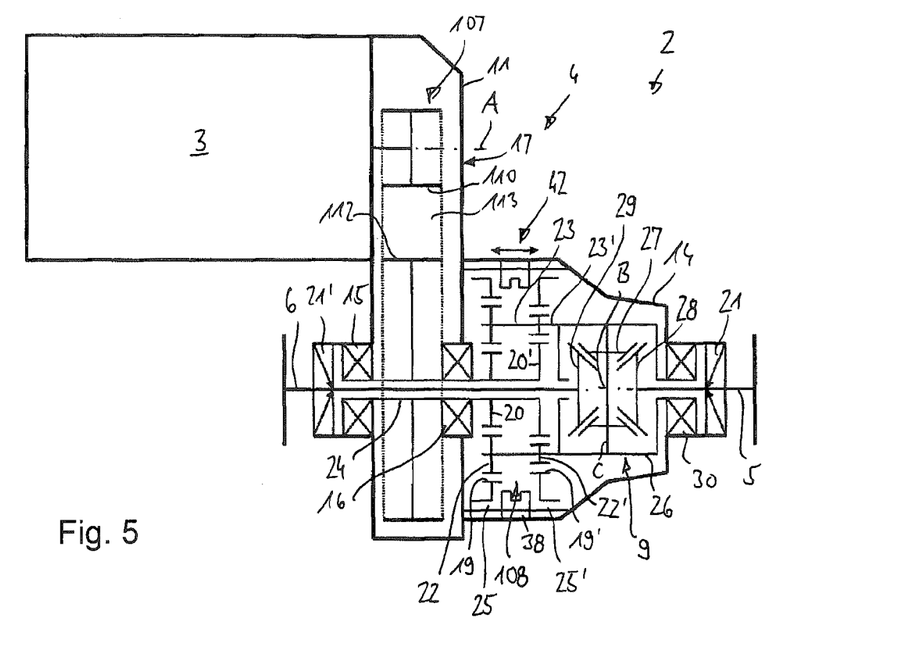

FIG. 5 shows an electric drive 2 according to a fifth embodiment. This embodiment corresponds to a combination of the embodiments of FIGS. 2 and 4, so that concerning the common features, it is referred to the above description. In this case, the same or corresponding components are provided with the same reference numerals.

The present embodiment is characterized in that the first gear stage 107 is formed as a chain drive, as in the embodiment of FIG. 2. Thus, the whole drive unit 3 can run for cooling or lubrication in a joint oil bath within the stationary housing 17. Furthermore, a clutch assembly 42 in form of a switching clutch is provided, as in the embodiment of FIG. 4. The switching clutch 42 can, selectively, connect the first ring gear 19 (first switching position) or the second ring gear 19' (second switching position) rotationally fixed to the stationary component 17 for supporting a torque or can be released relative thereto (third switching position). In the first switching position, a transmission ratio of up to 20 can be achieved. In the second switching position, depending on the number of teeth of the gears of the second planetary gear set 25', transmission ratios of 8 to 15 can be achieved, i.e. i2=8-15.

Figure 6:
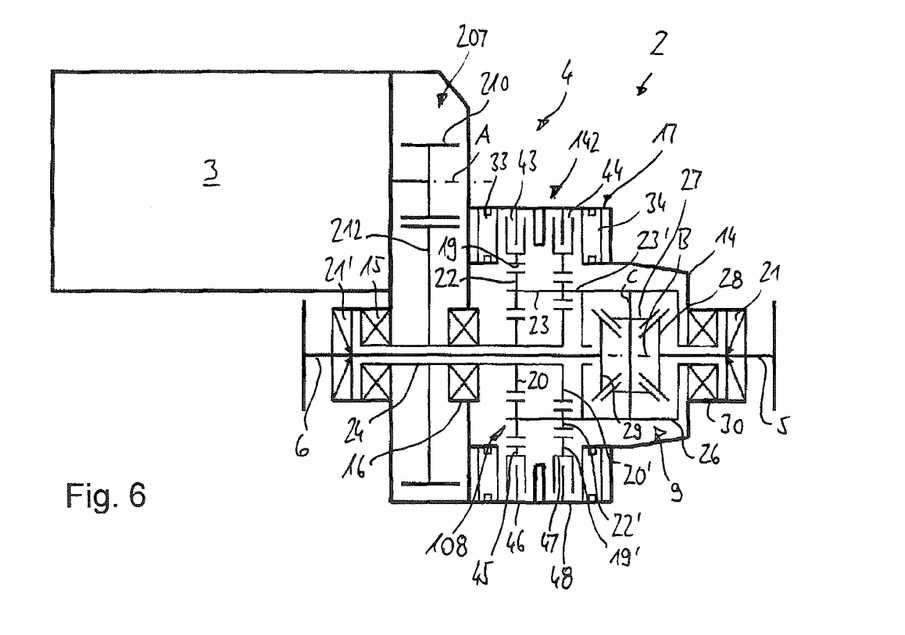

FIG. 6 shows an electric drive 2 according to a sixth embodiment. This embodiment generally corresponds to a combination of the embodiments of FIGS. 3 and 5, so that concerning the common features, it is referred to the above description. In this case, same or corresponding components are provided with the same reference numerals. Changed components are provided with reference numerals which are again increased by the numerical value 100.

In the present embodiment, the first gear stage 207 is formed as a single-stage spur gear drive, as it is shown in FIG. 3. It can be understood, however, that the first gear stage could also be formed as a belt drive of FIG. 1 or as a chain drive of FIG. 2. Further, it is visible, that a clutch assembly 142, similar to the embodiment of FIG. 5, is provided on the planetary drive 108.

A special feature of the present embodiment of FIG. 6 is that the clutch assembly 142 comprises a first friction clutch 43 and a second friction clutch 44, arranged axially next to each other.

The first friction clutch 43 is arranged in the power path between the first ring gear 19 and the stationary housing 17. The second friction clutch 44 is arranged in the power path between the second ring gear 19' and the housing 17. The two friction clutches 43, 44 may be formed as friction disk clutches. The first friction clutch 43 comprises a clutch input element 45, which is connected so as to be rotationally fixed to the first ring gear 19, a clutch output element 46, which is connected so as to be rotationally fixed to the housing 17, as well as a disk pack, which is arranged operationally between the clutch input element 45 and the clutch output element 46. The second friction clutch 44 comprises a clutch input element 47, which is connected so as to be rotationally fixed to the second ring gear 19', a clutch output element 48, which is connected so as to be rotationally fixed to the housing 17, as well as a disk pack, which is arranged operationally between the clutch input element 47 and the clutch output element 48. The two friction clutches 43, 44 are axially supported on a pressure plate 35, which is connected in fixed manner to the housing 17.

For actuating the first friction clutch 43, a first actuating device 33 is provided, which is represented schematically by a piston. For actuating the second friction clutch 44, a second actuating device 34 is provided, which is also represented schematically as a piston. The first or second actuating device 33, 34 are not limited to hydraulic actuators, but can have any form, for example also be in form of pneumatic, electromechanical or electro-magnetic actuators. The two actuating devices 33, 34 are controlled, as required, by a central control unit (not shown). By using two friction clutches 43, 44 and two separate actuating devices 33, 34, the two friction clutches 43, 44 can be controlled individually or independently of each other. The to be transmitted torque can be variably adjusted in dependency of the closed position of the corresponding friction clutch 43, 44 between a closed position, in which the whole torque is transmitted, and an open position, in which no torque is transmitted.

With the present embodiment with a spur gear drive 207 and a clutch assembly 142 with two friction clutches 43, 44, a transmission, as in the embodiments of FIGS. 4 and 5, can be achieved, which, respectively, have a switching clutch, i.e., when the first friction clutch 43 is completely closed and the second friction clutch 44 is completely open, so that the first ring gear 19 is supported rotation wise on the housing 17, a first transmission ratio i1 is achieved, which is smaller than 20 (i1<20), i.e. that the differential carrier 26 rotates slower than the electric motor 3.

If vice versa, the first friction clutch 43 is completely open and the second friction clutch 44 is completely closed, so that the second ring gear 19' is decelerated relative to the housing 17, a second transmission ratio i2 is achieved, which is smaller than the first transmission ratio i1 and can, especially, be between eight and fifteen (i2=8-15), i.e. that the differential carrier 26 rotates slower than the electric motor 3 (between ⅛ to 1/15 of the rotational speed of the electric motor 3). By means of corresponding control of at least one of the two friction clutches 43, 44 in the intermediate positions, also any other transmission ratio can be adjusted, which is between the maximum and the minimum transmission ratio. Especially, with the present embodiment, a load uninterrupted switching is possible. The switching can be carried out under load quickly and comfortably.

The electric drives 2 according to the above described embodiments have the advantage of a compact configuration, as the second and third gear stage, i.e. the planetary drive 8, 108 and the differential drive 9 are arranged coaxially to each other. The axle off-set, provided between the electric motor 3 and the second or third gear stage 8, 108, 9 is bridged by the first gear stage 7, 107, 207, which produces a transmission to a slower speed. Depending on the configuration of the first gear stage 7, 107, 207 or by means of providing a clutch assembly 42, 142, several different transmission ratios can be realized. This enables again an optimal adjustment between the electric motor 3 and the drive unit 4.

The invention claimed is:
1. An electric drive for a motor vehicle, comprising:
an electric motor and a drive unit, wherein the electric motor comprises an output shaft which is rotatingly drivable around a first rotational axis (A);
wherein the drive unit has a first gear stage that is driveable by the electric motor, a second gear stage that is driveable by the first gear stage, and a differential drive that is driveable by the second gear stage;
wherein the first gear stage comprises a driving wheel and an output wheel, wherein the driving wheel and the output wheel are drivingly connected to each other with a fixed transmission ratio, wherein the driving wheel is directly connected to the output shaft of the electric motor in a rotationally fixed way and is rotatingly driveable by the electric motor around the first rotational axis (A), and wherein the output wheel is rotatingly driveable around a second rotational axis (B);

wherein the second rotational axis (B) is arranged so as to be parallel off-set to the first rotational axis (A);

wherein the second gear stage comprises a planetary drive with an input element drivingly connected to the output wheel of the first gear stage, and an output element drivingly connected to the differential drive; and wherein the input element and the output element of the second gear stage as well as the differential drive are arranged coaxially to the second rotational axis (B);

the electric drive further comprising a housing with a first housing portion and a second housing portion connected to each other, and a hollow shaft extending from the first housing portion into the second housing portion;

wherein the first gear stage is arranged in the first housing portion, the second gear stage and the differential drive are arranged in the second housing portion, and the output wheel of the first gear stage is rotationally fixed to a first portion of the hollow shaft arranged in the first housing part, and the input element of the second gear stage is rotationally fixed to a second portion of the hollow shaft arranged in the second housing portion.

2. The electric drive according to claim 1, wherein the first gear stage comprises a reduction drive that is formed as one of a belt drive, a chain drive, and a spur gear drive.

3. The electric drive according to claim 1, wherein the second gear stage comprises a planetary drive with a ring gear, a sun gear, a plurality of planetary gears, and a planet carrier, wherein, one of the sun gear and the ring gear forms the input element that is rotatingly driveable by the output wheel of the first gear stage around the second rotational axis (B).

4. The electric drive according to claim 3, wherein the sun gear forms the input element drivingly connected to the output wheel of the first gear stage, and the ring gear is one of supported and supportable against rotation on a first stationary component, and wherein the planet carrier forms the output element of the second gear stage that is drivingly connected to the differential drive.

5. The electric drive according to claim 4, wherein, between the ring gear of the planetary drive and the stationary component, an externally controllable clutch assembly is provided that is configured to selectively at least one of connect the ring gear to the stationary component and release the ring gear from the stationary component.

6. The electric drive according to claim 5, wherein an actuating device for actuating the clutch assembly is provided.

7. The electric drive according to claim 5, wherein the planetary drive has a first planetary gear stage with a first transmission ratio between the input element and the output element, and a second planetary gear stage with a second transmission ratio between the input element and the output element.

8. The electric drive according to claim 7, wherein the clutch assembly is formed for the ring gear of the first planetary gear stage and the ring gear of the second planetary gear stage to selectively be one of supported on the stationary component against rotation and disconnected.

9. The electric drive according to claim 8, wherein:

the clutch assembly comprises a switching clutch that is transferable at least into a first switching position and into a second switching position, wherein, in the first switching position of the switching clutch, the ring gear of the first planetary gear stage is connected to the stationary component, and the ring gear of the second planetary gear stage can rotate freely relative to the stationary component, and wherein, in the second switching position of the switching clutch, the ring gear of the first planetary gear stage is freely rotatable relative to the stationary component, and the ring gear of the second planetary gear stage is connected to the stationary component.

10. The electric drive according to claim 9, wherein the switching clutch is transferable into a third switching position in which the first ring gear and the second ring gear are freely rotatable relative to the stationary component.

11. The electric drive according to claim 8, wherein:

the clutch assembly comprises a first friction clutch that is arranged between the ring gear of the first planetary gear stage and the stationary component, and a second friction clutch that is arranged between the ring gear of the second planetary gear stage and the stationary component.

12. The electric drive according to claim 11, wherein the first and the second friction clutch are each variably controllable between an open position, in which a torque transmission is interrupted, and a closed position, in which torque is transmitted.

13. The electric drive according to claim 11, wherein, for each of the first friction clutch and the second friction clutch, a separate actuating unit is provided by which the corresponding friction clutch is individually actuatable.

14. The electric drive according to claim 3, wherein the differential drive has a differential carrier that is rotatingly driveable by the planet carrier around the second rotational axis (B).

15. The electric drive according to claim 14, wherein the planetary drive and the differential drive are arranged axially next to each other.

16. The electric drive according to claim 14, wherein the output element of the planetary drive and the differential carrier of the differential drive are connected to each other in a rotationally fixed way and jointly rotate around the second rotational axis (B).

17. The electric drive according to claim 1, wherein the input element of the planetary drive and the output wheel of the first gear stage are connected to each other in a rotationally fixed way and jointly rotate around the second rotational axis (B).

18. The electric drive according to claim 1, wherein an opening between the first housing portion and the second housing portion, through which the hollow shaft extends, is sealed by a sealing ring;

an interior of the first housing portion is lubricant-free; and an interior of the second housing portion is at least partially filled with lubricant.

* * * * *